United States Patent [19]

Juergensen

[11] Patent Number: 5,475,495
[45] Date of Patent: Dec. 12, 1995

[54] SCANNING DEVICE FOR SELECTIVELY SCANNING CONTONE OR LINE ORIGINALS BY USE OF A SWITCH-OVER UNIT COMPRISING A MIRROR

[75] Inventor: Heinrich Juergensen, Raisdorf, Germany

[73] Assignee: Linotype-Hell AG, Eschborn, Germany

[21] Appl. No.: 977,416

[22] PCT Filed: Jun. 10, 1992

[86] PCT No.: PCT/DE92/00472

§ 371 Date: Feb. 12, 1993

§ 102(e) Date: Feb. 12, 1993

[87] PCT Pub. No.: WO92/22977

PCT Pub. Date: Dec. 23, 1992

[30] Foreign Application Priority Data

Jun. 14, 1991 [DE] Germany .......................... 41 19 563.9

[51] Int. Cl.[6] ............................... H04N 1/40; H04N 1/04; H04N 1/46; H01J 5/16
[52] U.S. Cl. .................. 358/298; 358/474; 358/484; 358/505; 250/227.26; 250/229
[58] Field of Search .................... 358/298, 296, 358/471, 474, 481, 484, 487, 505, 506, 512; 348/272, 290, 291, 294; 359/17; 250/208.1, 216, 227.26, 229, 578.1

[56] References Cited

U.S. PATENT DOCUMENTS

| 3,708,670 | 1/1973 | Back ................................ 250/229 X |
| 3,956,587 | 5/1976 | Nelson ................................... 178/7.6 |
| 4,189,752 | 2/1980 | Moe et al. .............................. 358/298 |
| 4,424,589 | 1/1984 | Thomas et al. .......................... 382/61 |
| 4,473,848 | 9/1984 | Juergensen .............................. 358/294 |
| 4,487,482 | 12/1984 | Itoh et al. ............................... 350/429 |
| 4,558,214 | 12/1985 | Fujii et al. .............................. 250/216 |
| 4,616,226 | 10/1986 | Morley ................................... 340/980 |
| 4,680,642 | 7/1987 | Shimano et al. ........................ 358/280 |
| 4,777,525 | 10/1988 | Preston, Jr. ............................. 358/102 |
| 4,816,922 | 3/1989 | Futaki ................................... 358/285 |
| 5,019,703 | 5/1991 | Boyd et al. ........................... 250/208.1 |

FOREIGN PATENT DOCUMENTS

| 0065242 | 11/1982 | European Pat. Off. ....... H04N 1/028 |
| 0105946 | 4/1984 | European Pat. Off. ....... H04N 1/028 |
| 3805366 | 8/1989 | Germany ...................... H04N 1/028 |

OTHER PUBLICATIONS

Patent Abstracts of Japan, vol. 012377 dated Jul. 10, 1988, "Copying Device Used for Both Full Color and Black–and–White", Mizuma Kenichi et al.
Patent Abstracts of Japan, No. JP63124065 dated May 27, 1988, Mizuma Kenichi et al "Copying Device used for Both Full Color and Black–and–White".

*Primary Examiner*—Peter S. Wong
*Assistant Examiner*—Eric Frahm
*Attorney, Agent, or Firm*—Hill, Steadman & Simpson

[57] ABSTRACT

A device for electro-optical point and line scanning of contone and line originals. A contone scanning unit for scanning a contone original and a line scanning unit for scanning a line original are provided. A mechanical switch-over unit comprising a mirror is arranged within a beam path of a scanning beam preceding the contone scanning unit and the line scanning unit. The mechanical switch-over unit selectively occludes either the contone scanning unit or the line scanning unit from the scanning beam for selectively scanning the contone original or a line original.

15 Claims, 4 Drawing Sheets

_,_,_

SCANNING DEVICE FOR SELECTIVELY SCANNING CONTONE OR LINE ORIGINALS BY USE OF A SWITCH-OVER UNIT COMPRISING A MIRROR

BACKGROUND OF THE INVENTION

The invention refers to the field of electronic reproduction technology and is directed to a device for point-by-point and line-by-line optoelectronic scanning of image originals, referred to as contone originals and/or originals having script and line elements, referred to as line originals.

In such scanner devices, an original is scanned point-by-point and line-by-line by an optoelectronic scanner element and the scan light reflected from the original (opaque original) or the scan light allowed to pass through the original (transparency original) and modulated with the informational content of the scanned original is converted into at least one image signal. The image signal can be digitally stored for later employment or can be directly supplied to a recording device for recording a reproduction of the original.

For a contone scanning and a line scanning, i.e. for scanning contone and line originals, separate scanner devices adapted to the respective application are generally employed. Given changing applications, however, a relatively complicated refitting of the scanner device can also be undertaken in that a contone scanner system is replaced by a line scanner system or vice versa. Beyond this, the known scanner devices for scanning line originals are not adequately suited for implementing line scannings at high speed. Specific devices are respectively employed for this purpose that are adapted to the respective application.

SUMMARY OF THE INVENTION

It is therefore an object of the present invention to improve a device of the type initially cited such that a flexible employment as well as a high scan speed are guaranteed.

This object is inventively achieved in that both a contone scanner system for the implementation of a contone scanning as well as a line scanner system for the implementation of a line scanning are provided, both the contone scanning system as well as the line scanning system are fashioned as multi-channel devices and a switchover means is provided for the selective connection of either the contone scanner system or the line scanner system.

This combination of the line scanner system and the contone scanner system makes it possible to offer a uniform apparatus that can be selectively employed for contone scanning or for line scanning dependent on a specifically existing application.

The multi-channel designing makes it possible to process color image originals in a contone scanning and to additionally undertake a scanning of the surrounding field. It has been particularly envisioned in a multi-channel line scanning to simultaneously acquire a plurality of tracks and to thereby multiply the scanning speed in accordance with the plurality of channels.

In particular, it has been conceived of beyond this to design the switch over means as a positionable mirror that selectively steers the optical information in the direction to the contone scanner system or to the line scanner system, and that occludes the system that is respectively not to be employed so that no signal falsification can ensue due to stray light effects or due to a processing of the optical information both with the line scanner system as well as with the contone scanner system.

In order to guarantee a compact structure, it is possible to undertake a conversion of the optical information into electrical information with multipliers to which both the output signals of the contone scanner system as well as the output signals of the line scanner system are supplied. An especially economical embodiment can be realized in that groups of four multipliers are employed in a standard embodiment for contone scans, and a respective channel for the line scanning is allocated to each of the multipliers.

It is proposed in a further, preferred embodiment that a varifocal lens is arranged in the line scanner system, this varifocal lens enabling an adaptation to different track widths during scanning in a simple way. Given a varifocal lens having a range of adjustment of, for example, 1:10, it is possible given a constant spacing of diaphragm apertures as well as a constant size of the diaphragm apertures in a diaphragm of the line scanner system to undertake an adaptation to different track spacings or track widths in a corresponding range. The diaphragm in the line scanner system can be constructed of light guides in an advantageous way, the entry cross sections of these light guides facing toward the varifocal lens.

It is proposed in another, preferred embodiment that an iris diaphragm is employed with the assistance of which the image brightness in the line scanning is defined dependent on the respective setting of the varifocal lens.

It has been particularly envisioned to realize a coupling of the adjustment of the iris diaphragm and the adjustment of the varifocal lens so that an adaptation can automatically occur. In a contone scanning, the iris diaphragm can be employed to improve the depth of field.

Further details of the present invention derive from the following, detailed description and from the attached drawings wherein preferred embodiments of the invention are illustrated by way of example.

DESCRIPTION OF THE PREFERRED EMBODIMENTS

Figure 1:
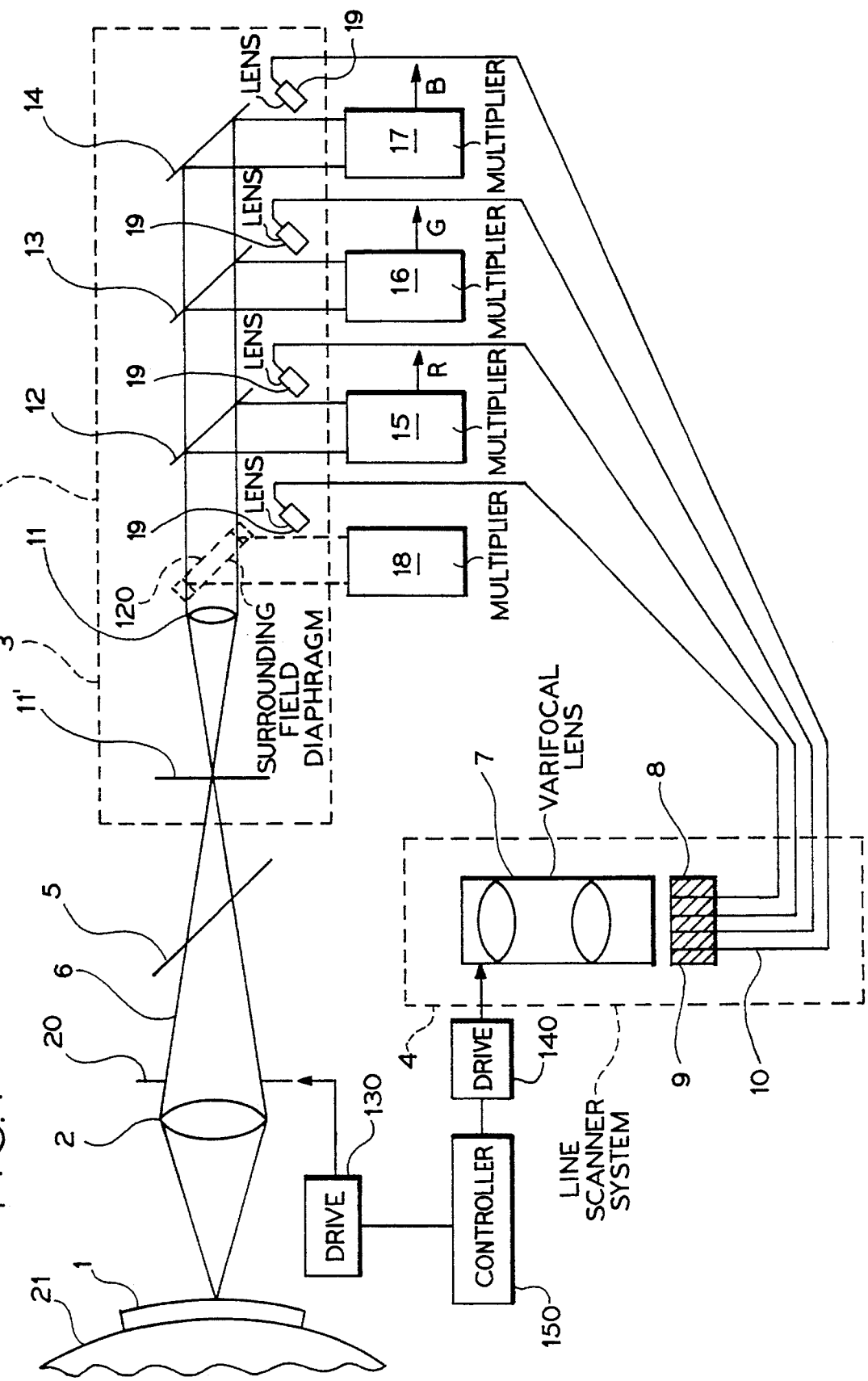
FIG. 1 is a schematic illustration of a device suitable both for the implementation of a line scanning as well as for the implementation of a contone scanning, said device comprising a switchover means.

FIG. 1 shows a schematic illustration of a device for the selective scanning of contone originals and line originals. Such a device for scanning originals 1 is essentially composed of a scanner lens 2, of a contone scanner system 3 for the implementation of a contone scanning as well as of a line scanner system 4 for the implementation of a line scanning. In accordance with the embodiment in FIG. 1, a switchover means 5 is provided with the assistance of which the scan light 6 reflected from an opaque original or transmitted by a transparency original and acquired via the scanner lens 2 is selectively supplied to the contone scanner system 3 or to the line scanner system 4.

It has been particularly envisioned to design the switchover means 5 as a mirror that can be suitably positioned in the beam path of the scan light 6 for the implementation of the switchover function. For example, a prism having a mirrored limiting face is also fundamentally suitable.

The line scanner system 4 for scanning monochromatic line originals is essentially constructed of a varifocal lens 7 as well as of a diaphragm 8. The diaphragm 8 is essentially composed of a mount 9 in the region of which light guides 10 are held, these light guides having their entry faces facing toward the varifocal lens 7. The light guides 10, for example, can be composed of glass fibers or of fibers of plastic.

The contone scanner system 3 for scanning contone originals, particularly chromatic image originals, is essentially composed of a scanner diaphragm 11', of a lens 11 that makes the scan light 6 parallel, of two dichroitic color splitters or color filters 12, 13 in combination with a mirror 14 for dissecting the scan light 6 into the color constituents "red", "green" and "blue", as well as of four multipliers 15, 16, 17, 18 wherein the chromatic light parts are optoelectronically converted into color signals (R, G, B). For the additional evaluation of the surrounding field, a surrounding field diaphragm 120 can be arranged in the beam path of the scan light 6, this diaphragm 120 reflecting the light coming from the scanned, surrounding field onto a further multiplier 18. The multiplier 18 converts the incident light into a surrounding field signal.

Lenses 19 are arranged at the light exit faces of the light guides 10, these lenses 19 facing toward the light entry faces of the four multipliers 15, 16, 17, 18. This embodiment makes it possible to optionally employ the four multipliers 15, 16, 17, 18 already present for the contone scanning for a four-channel line scanning as well. If a line scan is to occur with even more channels, a corresponding plurality of light guides and multipliers must be retrofitted.

A brightness setting occurs with the assistance of an iris diaphragm 20 that is arranged in the region of the scan lens 2. It has been particularly envisioned to couple a drive 140 of the varifocal lens 7 with a drive 130 of the iris diaphragm 20 in a line scanning. A controller 150 providing the coupling can, for example, control stepping motors that undertake the corresponding adjustments of the varifocal lens 7 as well as of the iris diaphragm 20. The original to be scanned can be arranged on an arbitrary mount, for example on a scanner drum 21, as shown, or in a stationary exposure trough shaped like a half-shell.

Figure 2:
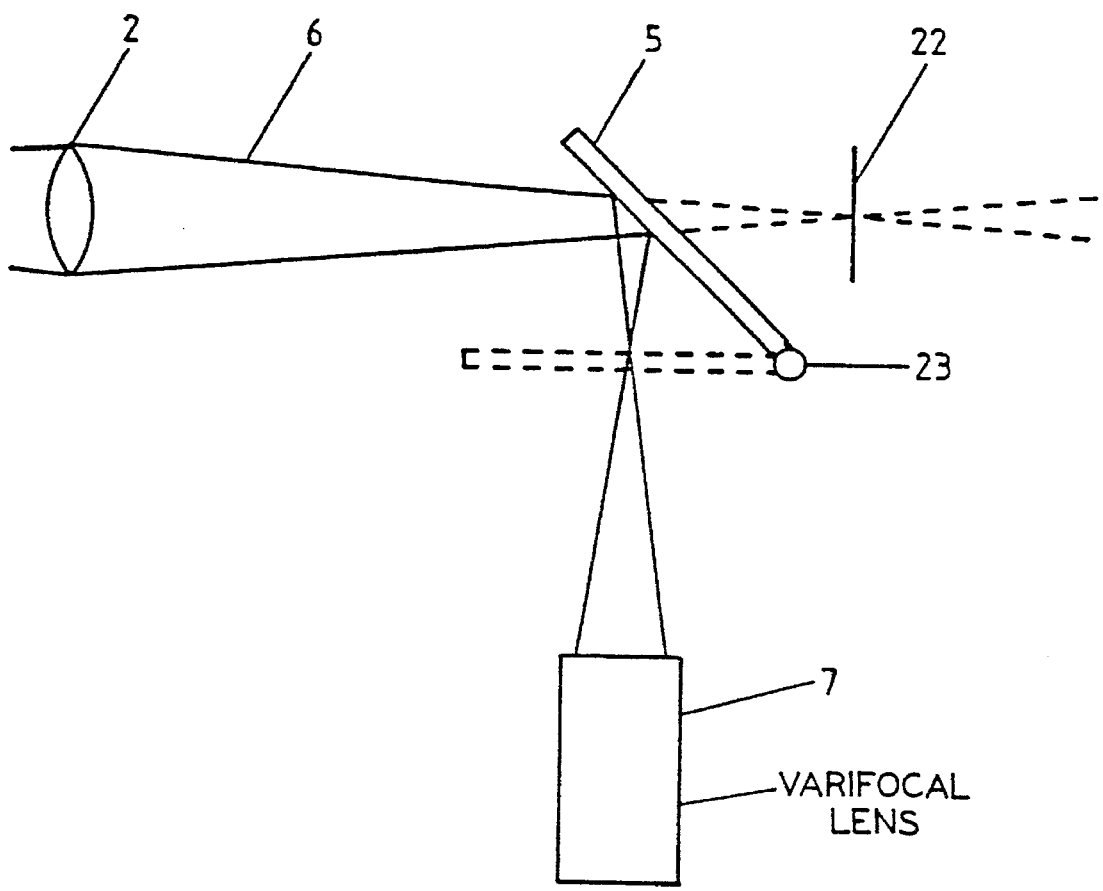
FIG. 2 is a schematic illustration of a device wherein the switchover means is designed as a folding mirror.

In the embodiment of FIG. 2, the switchover means 5 is designed as a folding mirror that can be positioned at a pivot bearing 23 such that the switchover means 5 occludes the scanner system 3, 4 that is respectively not charged with the beam path 6. Uncontrolled light paths are avoided in this way.

Figure 3:
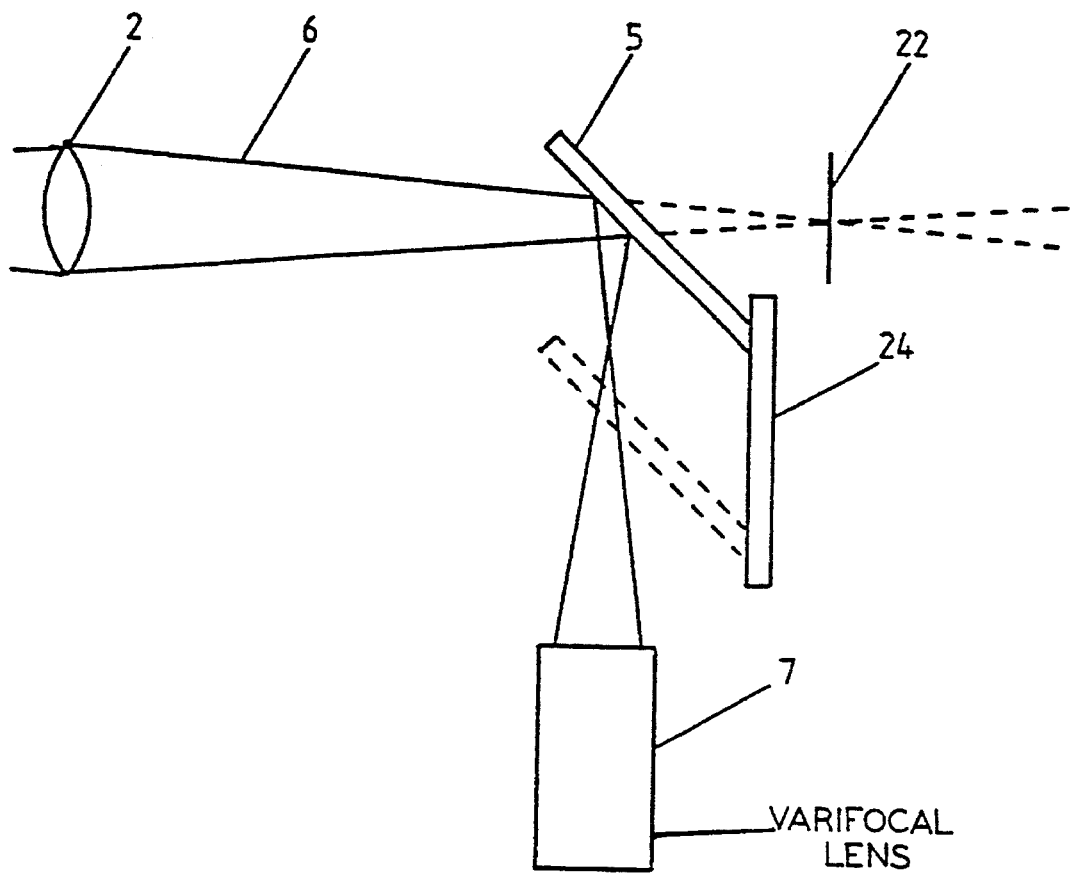
FIG. 3 is a schematic illustration of a device wherein the switchover means is designed as a displaceable mirror.

In the embodiment of FIG. 3, the switchover means 5 is designed as a displaceable mirror that can be positioned along a guide rail 24. In this embodiment, too, the switchover means 5 is arranged such that the respectively non-activated scanner system 3, 4 is occluded.

Figure 4:
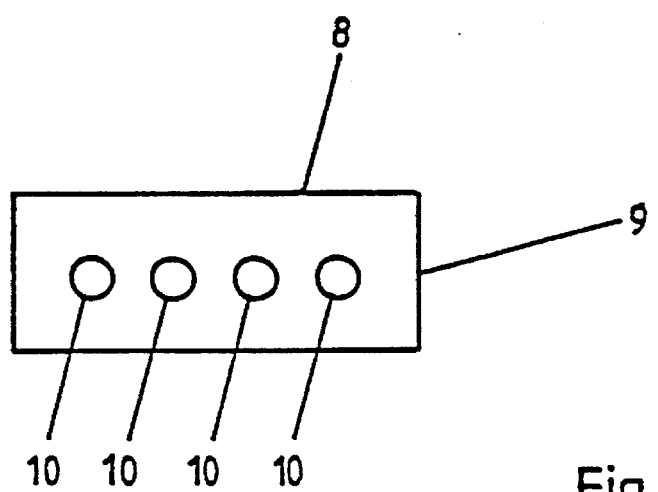
FIG. 4 is a plan view onto a diaphragm composed of four optical fibers that is arranged in the line scanner system.
Figure 5:
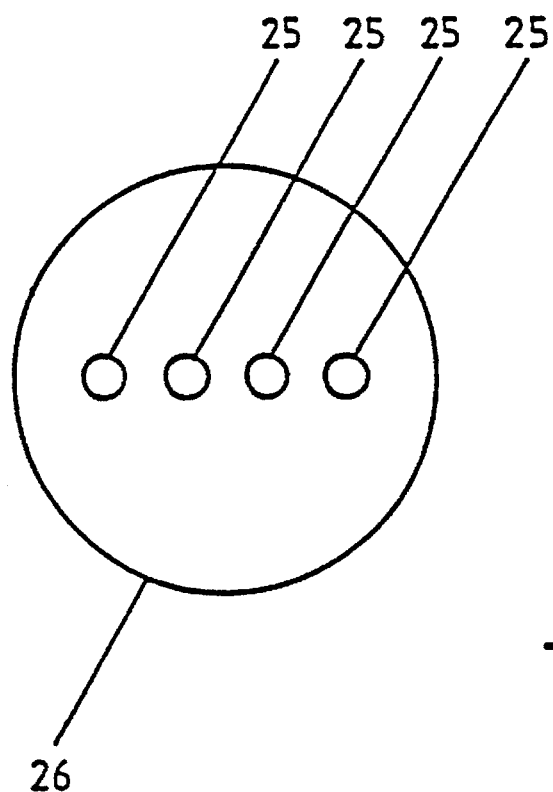
FIG. 5 is a schematic illustration of an arrangement of four scan spots in the region of an illumination spot.

It may be seen from the plan view onto the diaphragm 8 of FIG. 4 that the light guides 10 are arranged side-by-side. The diaphragm size is defined by the cross section of the corresponding light guides 10. A matching to the respective track width of the scanning in the line scanning or to the respective scanner feed occurs with the assistance of the varifocal lens 7. Corresponding to the illustration in FIG. 5, it is possible to allocate four scan spots 25 within one illumination spot 26. The illumination spot 26 can be realized by a reflector illumination or by a transparency illumination dependent on the nature of the original 1.

In the apparatus which are already equipped with four multipliers for contone scanning, thus, only the line scanner system needs to be added in an advantageous way in order to enable a selective contone scanning or line scanning. As a result of a compact structure of the device, the scope of possible uses can thereby be enhanced in a comparatively economical way without a substantial enlargement of the structural volume.

For scanning an original 1, the original 1 is first clamped onto the scanner drum 21. A point-by-point and line-by-line or track-by-track scanning of the original 1 subsequently occurs. In a line scanning, the switchover means 5 is first positioned in the beam path of the scan light such that this light is steered into the region of the varifocal lens 7. In particular, the track width of the scan is matched by the setting of the varifocal lens 7 to the track width of the recording provided for the later recording. The different image brightness produced by this setting of the varifocal lens 7 is compensated with the assistance of the iris diaphragm 20. The image information acquired in this way is conducted via the light guides 10 to the multipliers 15, 16, 17, 18 and is converted into image signals in these multipliers. The contone scanner system 3 is occluded given this positioning of the switchover means 5.

The only thing required for switching to contone scanning is to position the switchover means 5 such that the line scanner system 4 is occluded. Given such a positioning of the switchover means 5, the scan light 6 impinges the contone scanner system 3.

Although various minor changes and modifications might be proposed by those skilled in the art, it will be understood that I wish to include within the claims of the patent warranted hereon all such changes and modifications as reasonably come within my contribution to the art.

I claim:

1. A device for point-by-point and line-by-line optoelectronic scanning of an original, comprising:

a contone scanning means for scanning a contone original;

a line scanning means for scanning a line original;

said contone scanning means and said line scanning unit each having at least one scanning channel;

a mechanical switch-over means comprising a mirror; and said mechanical switch-over means being arranged within a beam path of a scanning beam preceding said contone scanning means and said line scanning for selectively occluding either said contone scanning means or said line scanning means from the scanning beam for selectively scanning the contone original or the line original.

2. A device according to claim 1 wherein the mirror of said switch-over means is displaceable along a guide rail.

3. A device according to claim 1 wherein the mirror of said switch-over means is a tipping mirror pivotable around a pivot bearing.

4. A device according to claim 1 wherein each channel of the contone scanning means and each channel of said line scanning means are allocated to respective common multipliers.

5. A device according to claim 4 wherein the common multipliers are associated with said contone scanning means.

6. A device according to claim 1 wherein each channel of the contone scanning means is optically coupled to respective multipliers;

said line scanning means comprises a lens and light guides having light exit faces for each channel of the line scanning means; and each channel of the line scanning means being optically coupled to said multipliers within said contone scanning means by said light guides.

7. A device according to claim 6 wherein said light exit faces of the light guides facing toward the multipliers are provided with lenses.

8. A device according to claim 6 wherein said lens of the line scanning means is provided as a verifocal lens.

9. A device according to claim 8 wherein said verifocal lens is connected to a controller for adapting its adjustment to a scan track of said light beam on the original.

10. A device according to claim 8 wherein an iris diaphragm facing toward the original is arranged in a region of a scanning lens within said beam path of the scanning beam; and the iris diaphragm is provided with a drive means for being driven dependent on an adjustment of said verifocal lens.

11. A device for point-by-point and line-by-line opto-electronic scanning of an original, comprising:

a contone scanning unit for scanning a contone original;

a line scanning unit for scanning a line original;

said contone scanning unit and said line scanning unit each having at least one scanning channel;

a mechanical switch-over unit comprising a mirror;

said switch-over unit being arranged within a beam path of the scanning beam preceding said contone scanning unit and said line scanning unit; and said mechanical switch-over unit having a positioning structure connected thereto for selectively placing the mirror within said beam path for selectively occluding either said contone scanning unit or said line scanning unit from the scanning beam for selectively scanning the contone original or the line original.

12. A device for point-by-point and line-by-line opto-electronic scanning of an original, comprising:

a contone scanning means for scanning a contone original;

a line scanning means for scanning a line original;

said contone scanning means and said line scanning means each having a given number of scan channels;

a switch-over means for selective connection of either the contone scanning means or the line scanning means; and both the given number of scan channels associated with the contone scanning means as well as the given number of scan channels associated with the line scanning means being allocated to a respective common single multiplier serving both the contone scanning means and the line scanning means for each scan channel.

13. A device for point-by-point and line-by-line opto-electronic scanning of an original, comprising:

a contone scanning means for scanning the contone originals;

a line scanning means for scanning a line original;

said contone scanning means and said line scanning means each having a given number of channels;

a switch-over means for selective connection of either the contone scanning means or the line scanning means; and four multipliers being provided with each multiplier being optically coupled to one of the scan channels of the contone scanning means and the line scanning means.

14. A device according to claim 12 wherein an iris diaphragm facing toward the original is arranged in a region of a scan lens of said line scanning means, and wherein said iris diaphragm is provided with a drive means for being driven dependent on adjustment of said scan lens, said scan lens comprising a verifocal lens.

15. A device for point-by-point and line-by-line opto-electronic scanning of an original, comprising:

contone scanning means for scanning a contone original;

a line scanning means for scanning a line original;

said contone scanning means and said line scanning means each having a same given number of output channels at which light signals are output;

a plurality of opto-electronic converters equal to said given number, each of the opto-electronic converters being optically coupled to one of said output channels of said line scanning means and one of said output channels of said contone scanning means, said opto-electronic converter converting light signals from the output channels to corresponding color signals; and switch-over means for causing light outputs either from the contone scanning means or the line scanning means to said opto-electronic converters.

* * * * *